(12) United States Patent
Gao et al.

(10) Patent No.: US 12,348,899 B2
(45) Date of Patent: Jul. 1, 2025

(54) AD HOC CLIENT AUDIO DEVICE SUPPORT FOR VIRTUAL CONFERENCES

(71) Applicant: Zoom Video Communications, Inc., San Jose, CA (US)

(72) Inventors: Qiang Gao, Charlotte, NC (US); Zhaofeng Jia, Saratoga, CA (US); Qiyong Liu, Singapore (SG); Xinyu Yao, Hefei (CN); Shaoming Ye, Hefei (CN); Xiangming Zhu, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 204 days.

(21) Appl. No.: 17/983,568

(22) Filed: Nov. 9, 2022

(65) Prior Publication Data

US 2024/0155073 A1    May 9, 2024

(51) Int. Cl.
*H04N 7/15*     (2006.01)
*G06F 21/31*    (2013.01)
*H04N 7/14*     (2006.01)

(52) U.S. Cl.
CPC ............... *H04N 7/15* (2013.01); *G06F 21/31* (2013.01); *H04N 7/147* (2013.01)

(58) Field of Classification Search
None
See application file for complete search history.

(56) References Cited

U.S. PATENT DOCUMENTS

| 6,772,436 B1 * | 8/2004 | Doganata | H04N 21/8106 725/100 |
| 2013/0106977 A1 * | 5/2013 | Chu | H04M 3/568 348/E7.083 |
| 2015/0081796 A1 * | 3/2015 | Xu | H04L 67/141 709/204 |

* cited by examiner

*Primary Examiner* — Hemant S Patel
(74) *Attorney, Agent, or Firm* — Kilpatrick Townsend & Stockton LLP

(57) ABSTRACT

One example method for ad hoc client audio device support for virtual conferences includes transmitting, via a first communication channel by a virtual conference device connected to a virtual conference hosted by a virtual conference provider, a first signal, the first signal including connection information to enable a network connection between a remote client device and the virtual conference device; receiving, by the virtual conference device via a second communication channel, a request to connect from the remote client device; connecting to the remote client device using the second communication channel; receiving, via the connection to the remote client device, an audio stream from the remote client device, the audio stream captured by a microphone of the remote client device; and providing the audio stream to the virtual conference.

11 Claims, 11 Drawing Sheets

AD HOC CLIENT AUDIO DEVICE SUPPORT FOR VIRTUAL CONFERENCES

FIELD

The present application generally relates to virtual conferences and more particularly relates to ad hoc client audio device support for virtual conferences.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
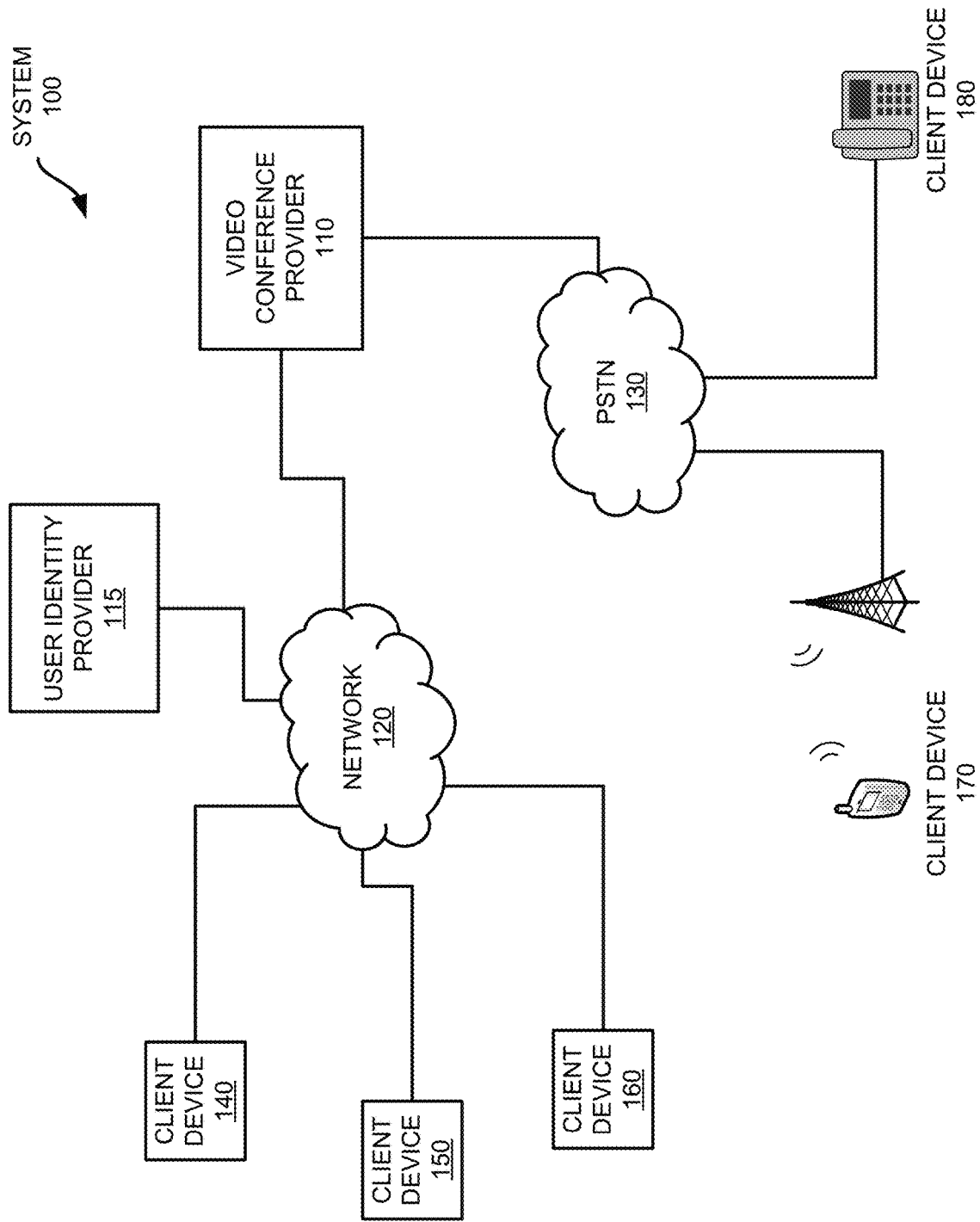
FIGS. 1-2 show example systems for ad hoc client audio device support for virtual conferences.

Examples are described herein in the context of ad hoc client audio device support for virtual conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During a virtual conference, participants may engage with each other to discuss any matters of interest. Typically, such participants will interact in a virtual conference using a camera and microphone, which provide video and audio streams (each a "media" stream; collectively "multimedia" streams) that can be delivered to the other participants by the virtual conference provider and be displayed via the various client devices' displays or speakers.

Participants may use software applications running on their client devices to join a video conference and use a camera and microphone to provide video and audio streams to the other participants. In some cases, participants may all gather in a larger room, such as a conference room, and collectively join a video conference using video conferencing equipment within the room, such as a large display screen on one of the room's walls, one or more microphones positioned on a conference table, and a camera positioned to capture the room and the participants within it.

In settings like these, users may be positioned throughout the room, which may mean that some are positioned near to one of the available microphones, while others may not be. Those who are distant from the microphone(s) in the room may be difficult to hear by other participants in the video conference. To help to improve the audio quality in such settings, the system may allow the users to connect to the video conferencing equipment using a personal device, such as a smartphone, and use the microphone on their personal device as a microphone for the video conferencing equipment.

To connect to the video conferencing equipment, the user may launch a video conferencing application on their personal device and select an option to connect to a video conferencing room. The personal device will then receive ultrasonic sound from the video conferencing equipment, which repeatedly transmits an ultrasonic signal that includes information to connect to the video conferencing equipment, such as a network address or passcode for the video conference. The personal device will then communicate to the video conferencing equipment using a higher-bandwidth networking connection, such as WiFi, and request to connect to the video conferencing equipment. The video conferencing equipment will then accept the connection request and register the personal device as an audio source in the video conference.

Once connected, the smartphone may operate as a microphone for that user. The user may then be presented with a virtual button on the device's screen. When the user presses the button, it activates the microphone on their personal device and transmits captured audio to the video conferencing equipment as an audio stream. The video conferencing equipment then provides the audio stream to the video conference as though it had been captured by one of the microphones positioned within the room. As a result, the user can be clearly heard by the other participants in the video conference and the experience is improved for all of the participants.

This illustrative example is given to introduce the reader to the general subject matter discussed herein and the disclosure is not limited to this example. The following sections describe various additional non-limiting examples and examples of ad hoc client audio device support for virtual conferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
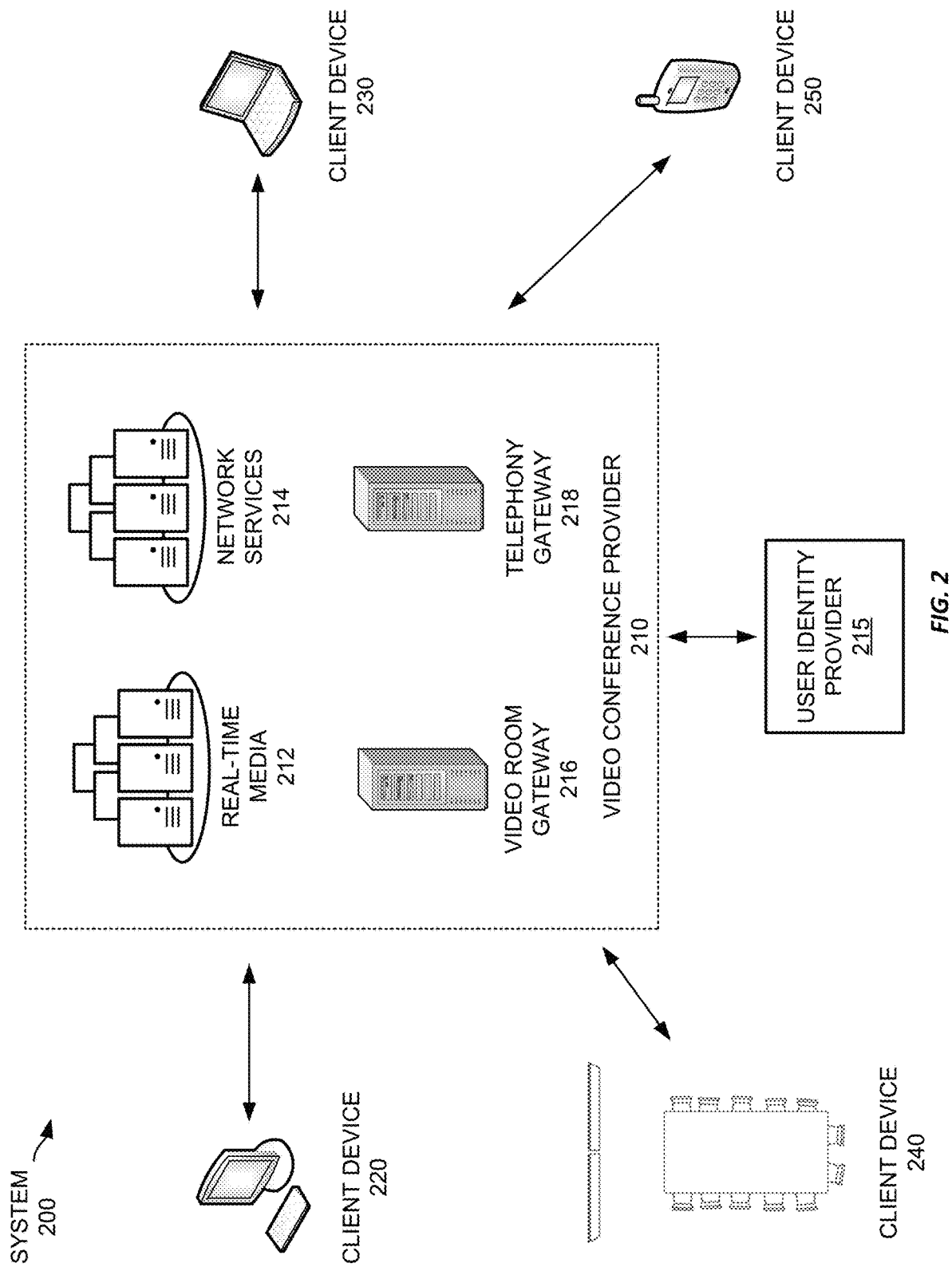

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
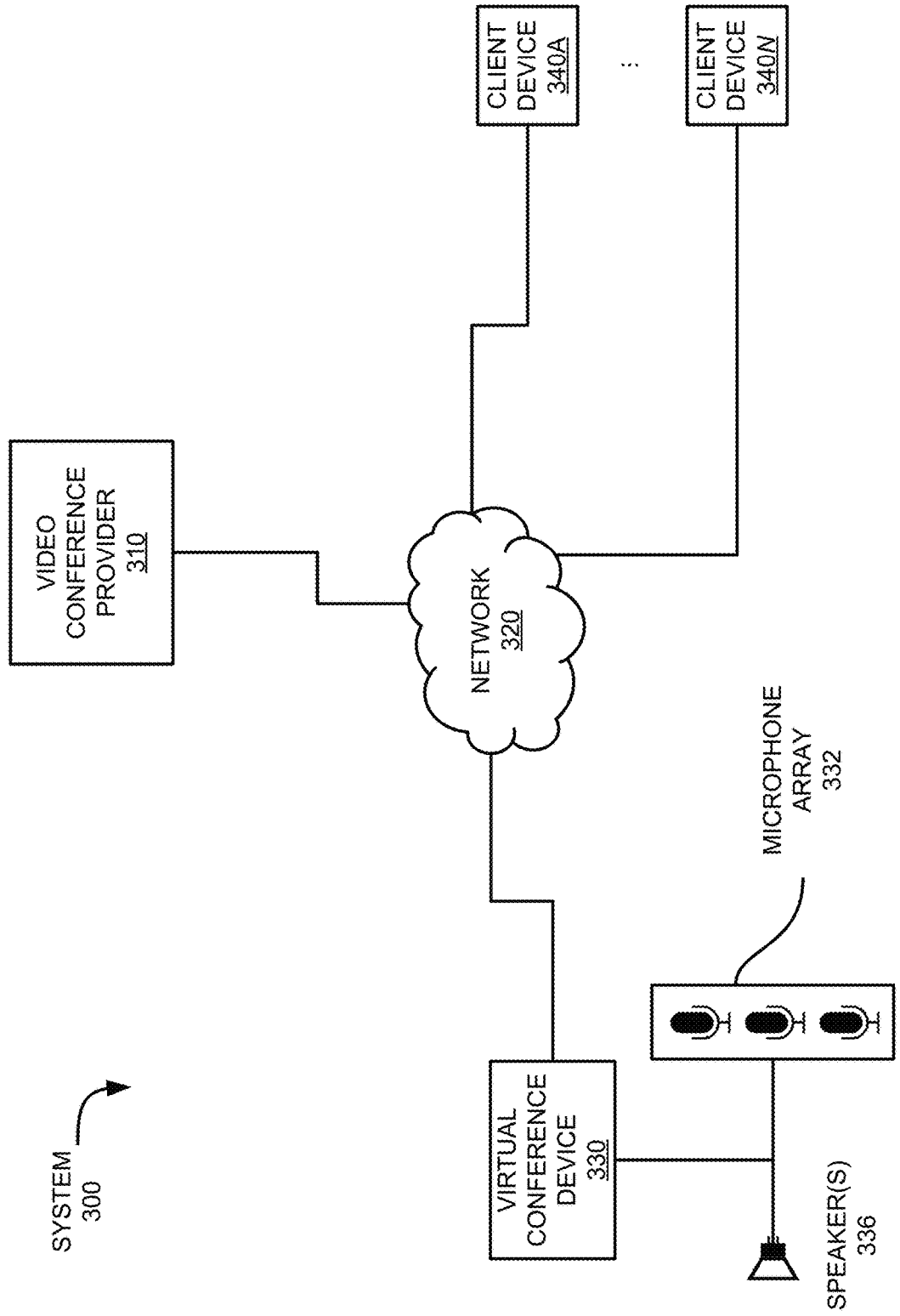
FIGS. 3A-3B show examples systems for ad hoc client audio device support for virtual conferences.
Figure 3B:
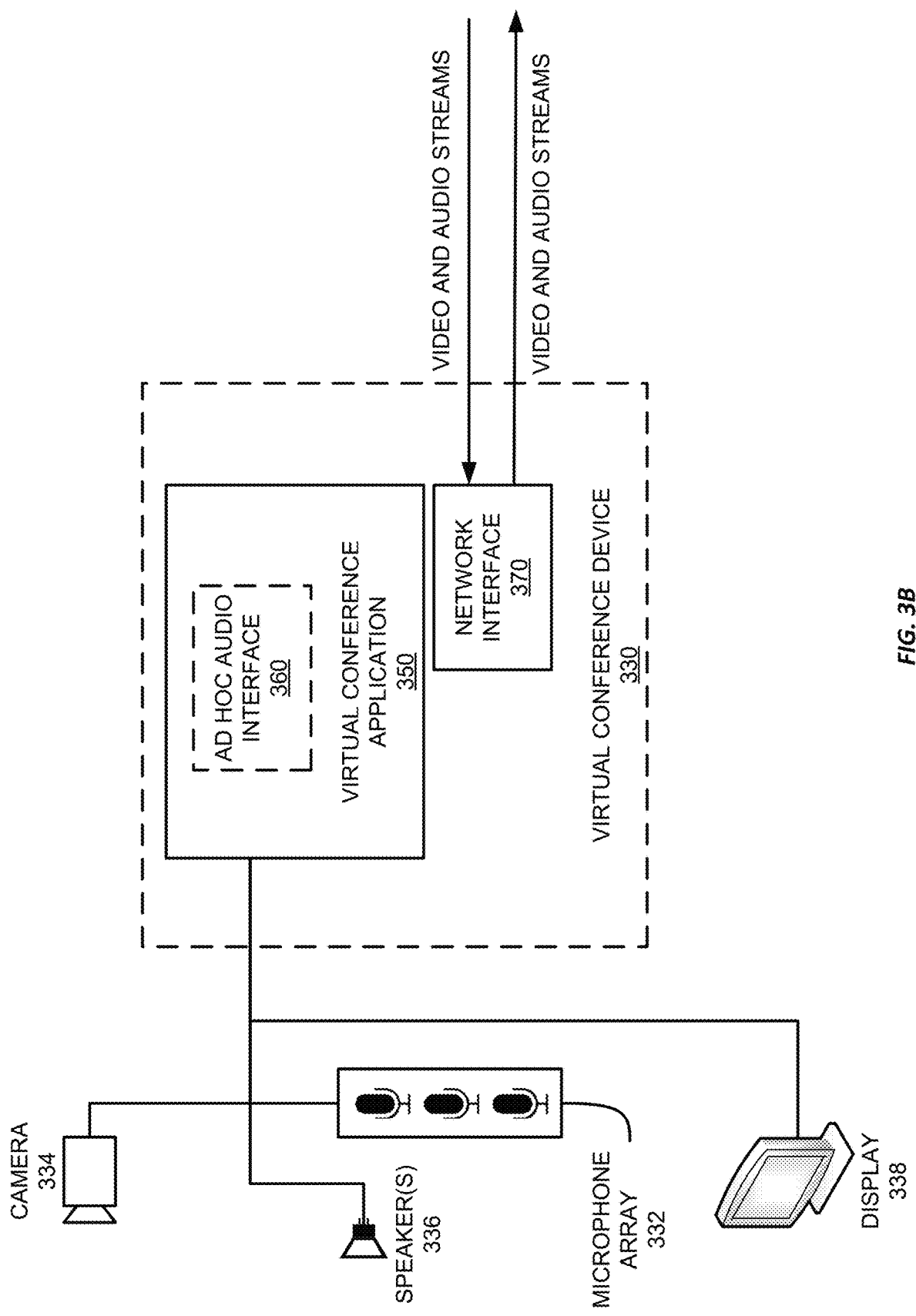

Referring now to FIGS. 3A-3B, FIG. 3A shows an example system 300 for remotely adjusting audio capture during video conferences. In this example system 300, a virtual conference device 330 and a number of client device 340a-n are connected to a video conference provider 310 via a communications network 320. In this example, the communications network 320 is the internet, however, any suitable communications network or combination of communications network may be employed, including LANs (e.g., within a corporate private LAN), WANs, etc.

In this example, virtual conference device 330 provides video conferencing functionality to a group of people assembled in a common area, such as a conference room, similar to client device 240 in FIG. 2. The virtual conference device 330 in this example includes a computing device, camera(s), a microphone array 332, and one or more speakers 336 installed within a conference room. Thus, while the virtual conference device 330 operates as a client device, its hardware components are dispersed throughout the conference room to enable multiple people to join from the conference room, rather than a personal client device, such as a smartphone, tablet computer, or laptop computer. The virtual conference device 330 has virtual conferencing software installed on it to enable it to connect to virtual conferences hosted by the virtual conference provider 310, to capture audio and video data using the microphone array 332 and camera(s) (not shown), and exchange audio and video streams with other participants via the virtual conference provider 310. While the virtual conference device 330 in some examples may include dedicated video conferencing equipment as discussed above, in other examples, it may be a conventional computing device, such as a desktop or laptop computer, or a handheld device such as a tablet or smartphone.

Similarly, each client device 340a-n executes video conference software, which connects to the video conference provider 310 and joins a meeting. During the meeting, the various participants, via their respective client devices, are able to interact with each other to conduct the meeting, such as by viewing video streams and hearing audio streams from other participants, and by capturing and transmitting video and audio of themselves.

Referring now to FIG. 3B, FIG. 3B shows a more detailed view of the virtual conference device 330. In this example, the virtual conference device 330 has one or more cameras 334 and one or more microphone arrays 332 to allow the user to provide audio and video streams to the video conference. In addition, the client device 330 executes a virtual conferencing application 350 to allow participants to join and participate in video conferences hosted by the video conference provider 310, generally as discussed above. The virtual conference device connects to the virtual conference provider 310 using the network interface, which may be a wired interface, such as an Ethernet interface, or a wireless interface, such as a WiFi interface.

However, a problem that can arise in virtual conferences when multiple people are grouped together within a room is that some participants may be distant from available microphones and thus may be difficult to hear for participants at remote locations. To address this, the microphone arrays can be relocated within the room or multiple microphone arrays may be installed within the room. However, this can be expensive and may still not adequately cover the entire conference room.

To help alleviate this issue, the virtual conference application includes an ad hoc audio interface 350 to enable other devices in the conference room to connect to the virtual conference device and use their own respective microphones as audio capture devices for the virtual conference device 330. The ad hoc audio interface 360 allows a user's personal client device to connect to the virtual conference device 330 and to allow the user's personal client device to capture audio using its microphone and stream the captured audio data to the virtual conference device 330, which can then provide it to the other participants via the virtual conference provider 310. While the ad hoc audio interface 360 is depicted as being a discrete module within the virtual conference application 350, it can be implemented in any suitable manner.

Figure 4A:
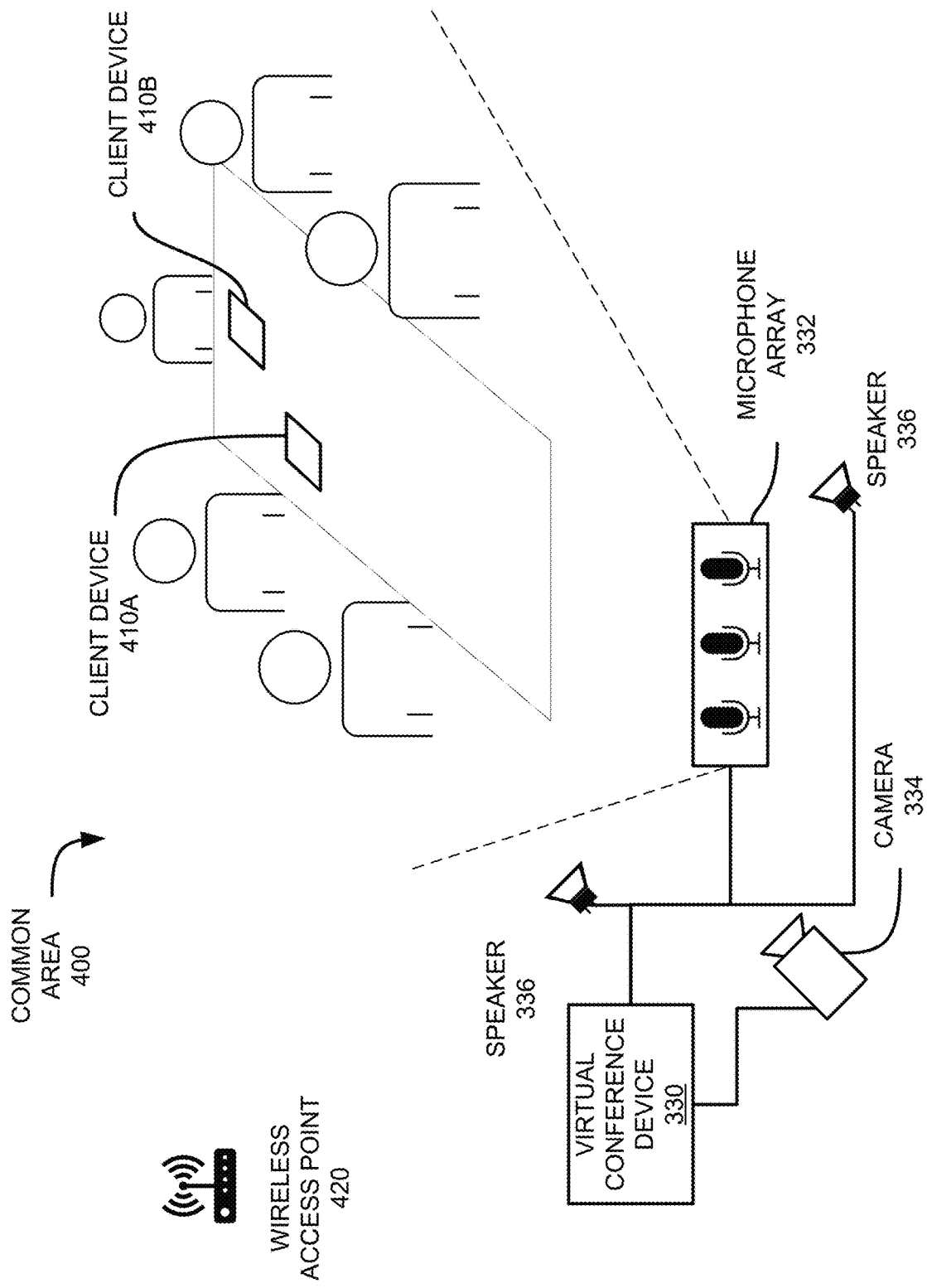
FIGS. 4A-4D show an example system for ad hoc client audio device support for virtual conferences.

Referring now to FIG. 4A, FIG. 4A shows an example common area 400, such as a conference room, in which multiple people are sitting around a conference table. The people in the room can connect to a virtual conference using the virtual conference device 330 and can interact with the other participants in the virtual conference using the camera 334 and microphone array 332 and can see and hear the other participants via the display 338 (not shown) and speakers 336.

In addition to the virtual conference device 330, two people in the common area 400 are using client device 410a-b, which may be connected to a wireless network via the available wireless access point 420. As discussed above with respect to FIG. 3A, the client devices 410a-b may be any suitable client device, such as a smartphone, tablet computer, or laptop computer. During the virtual conference, the user of client device 410a elects to use it as a microphone device so they can be better heard by the other participants in the virtual conference. In this example, the microphone array 332 is positioned at one end of the room, away from the participants with the client devices 410a-b. Thus, the client devices 410a-b may provide better quality audio input devices for their respective users.

Figure 4B:
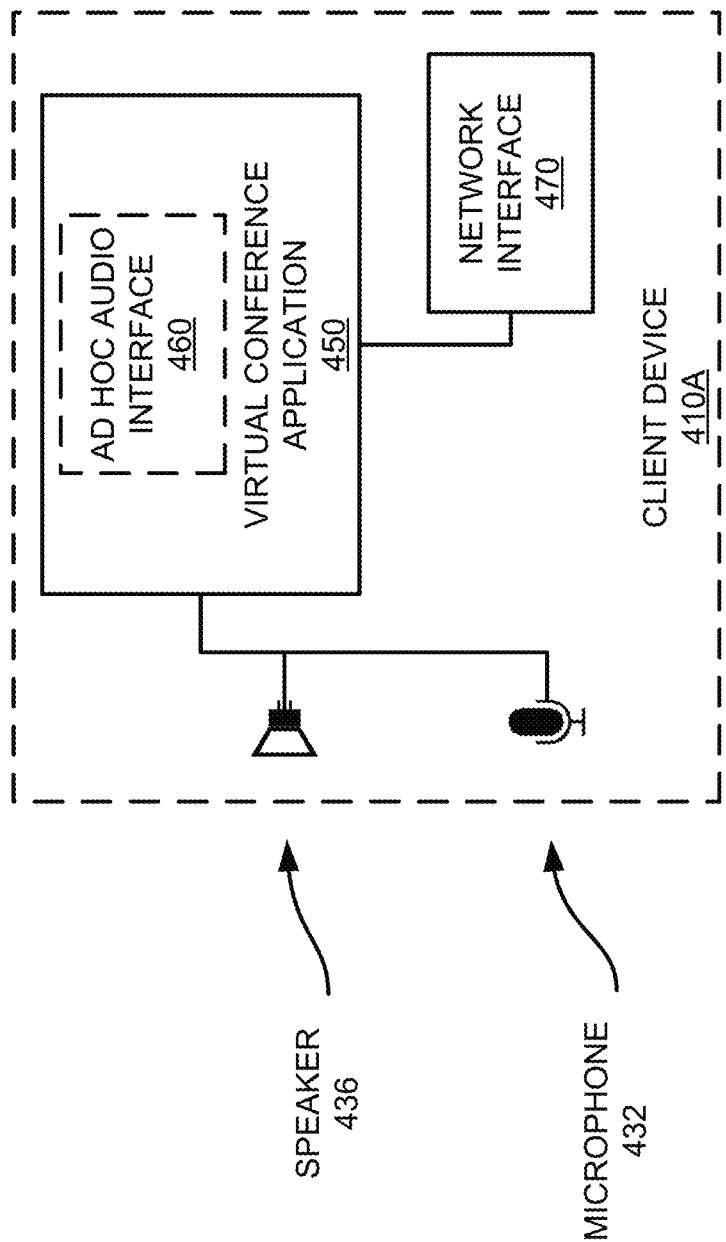

Referring now to FIG. 4B, FIG. 4B shows an example client device, such as client device 410a, that is configured to connect to a virtual conference device 330 that provides ad hoc client audio device support for virtual conferences. The client device 410a executes a virtual conference application 450 that includes an ad hoc audio interface. In this example, the client device includes an internal microphone 432 and speaker 436, though other examples may employ external microphones or speakers.

To use the client device's microphone 432 as an audio input for the virtual conference, the user selects an option within a GUI presented by the virtual conference application to connect to the virtual conference device 330. The client device 410a then receives an ultrasonic signal from the virtual conference device 330 using its microphone 432. The virtual conference device 330 repeatedly transmits the ultrasonic signal so that any device can receive it when needed. Because the signal was sent ultrasonically, e.g., at frequencies above 20 kHz, it is beyond the hearing range of the people in the conference room or attending the virtual conference, but it can be received and processed by the client device 410a. The received ultrasonic signals are filtered from the audio data within an audible range, e.g., 60 Hz to 20 kHz, and are passed to the ad hoc audio interface 460, which decodes the connection information to connect to the video conferencing device via a network interface. The connection information may include a network address such as an IP address of the virtual conference device, a passcode, a URL, or other information to enable the participant's client device to connect to the virtual conference device 330. The client device 410a may then begin capturing and transmitting audio data to the virtual conference device 330 via the network interface 470. The virtual conference device 330 receives the incoming audio data using its network interface and provides it to the virtual conference as though it was captured by a microphone connected to the virtual conference device 330.

It should be appreciated that while in this example, the virtual conference device 433 repeatedly transmits the ultrasonic signal, in some examples the virtual conference device may only transmit the ultrasonic signal in response to a request from a client device 410a for connection information. For example, the client device 410a may transmit an ultrasonic request for connection information, which the virtual conference device 330 may receive using its speakers. The virtual conference device 330 may then generate and transmit the ultrasonic signal including the connection information as discussed above.

While in this example, the client device 410a obtains the connection information using ultrasound transmissions, other techniques may be used. For example, in some examples, the network interface 470 may include a Bluetooth interface, near-field communication ("NFC") interface, or a wired interface, such as a universal serial bus ("USB") interface. Thus, the client device may be able to connect to the virtual conference device 330 via the Bluetooth interface to obtain connection information, generally as discussed above, and then use the connection information to connect to the client device 410a via another network connection, such as via WiFi as discussed above. In some examples, the client device 410a may use its camera (not shown) to capture a quick response ("QR") code or bar code affixed to the virtual conference device 330 that provides connection information to the virtual conference device 330. It may then use the received connection information to connect to the virtual conference device 330.

Figure 4C:
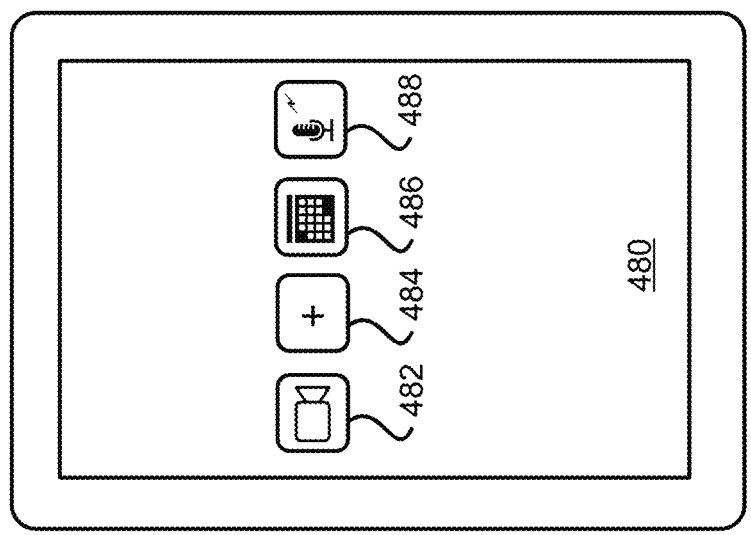

Referring now to FIG. 4C, FIG. 4C shows a GUI 480 provided by the client device 410a after the user has executed virtual conference application 450. The GUI 480 includes several options for the user to select from, including an option 482 to create a new virtual conference, an option 484 to join an on-going virtual conference, an option 486 to schedule a new virtual conference at a later date and time, and an option 488 to operate the client device 410a as an ad hoc microphone by connecting to a virtual conference device 330.

Figure 4D:
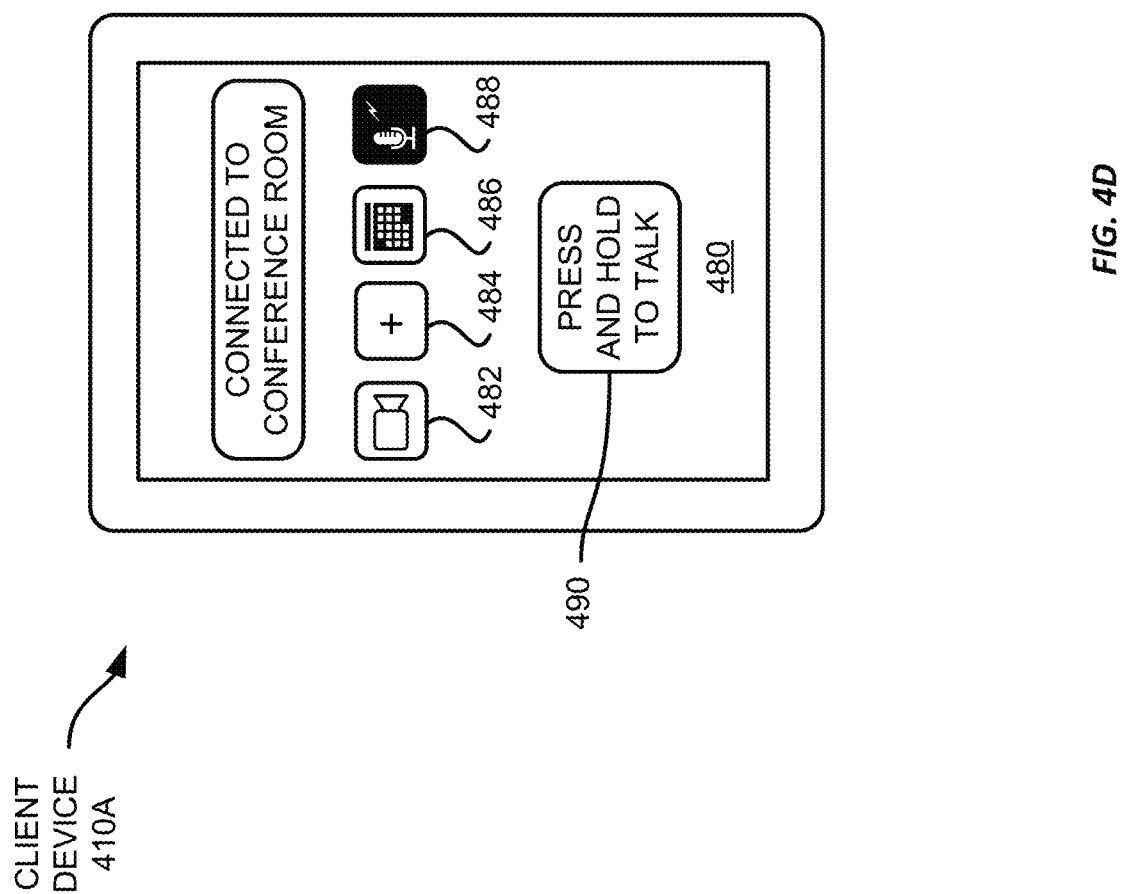

To connect to the virtual conference device 330, the user can select the option 488 to connect. After making the selection, the client device 410a connects to the virtual conference device 330 as discussed above with respect to FIG. 4B. After connecting to the virtual conference device 330, the GUI 480 presents the option 488 as darkened to indicate that the client device 410a has connected to the virtual conference device 330 and is operating as an ad hoc microphone as shown in FIG. 4D. In addition, the GUI 480 indicates that it is connected to the conference room and provides a button 490 for the user to press and hold to use the device's microphone to speak during the virtual conference.

In this example, because the client device 410a communicates via ultrasound, the user may not need to select a particular virtual conference device since ultrasound may not easily travel through walls to virtual conference devices in adjacent conference rooms. However, in some examples, a user may be presented with one or more available virtual conference devices 330 to connect to, from which the user may then select the appropriate device 330.

Figure 5:
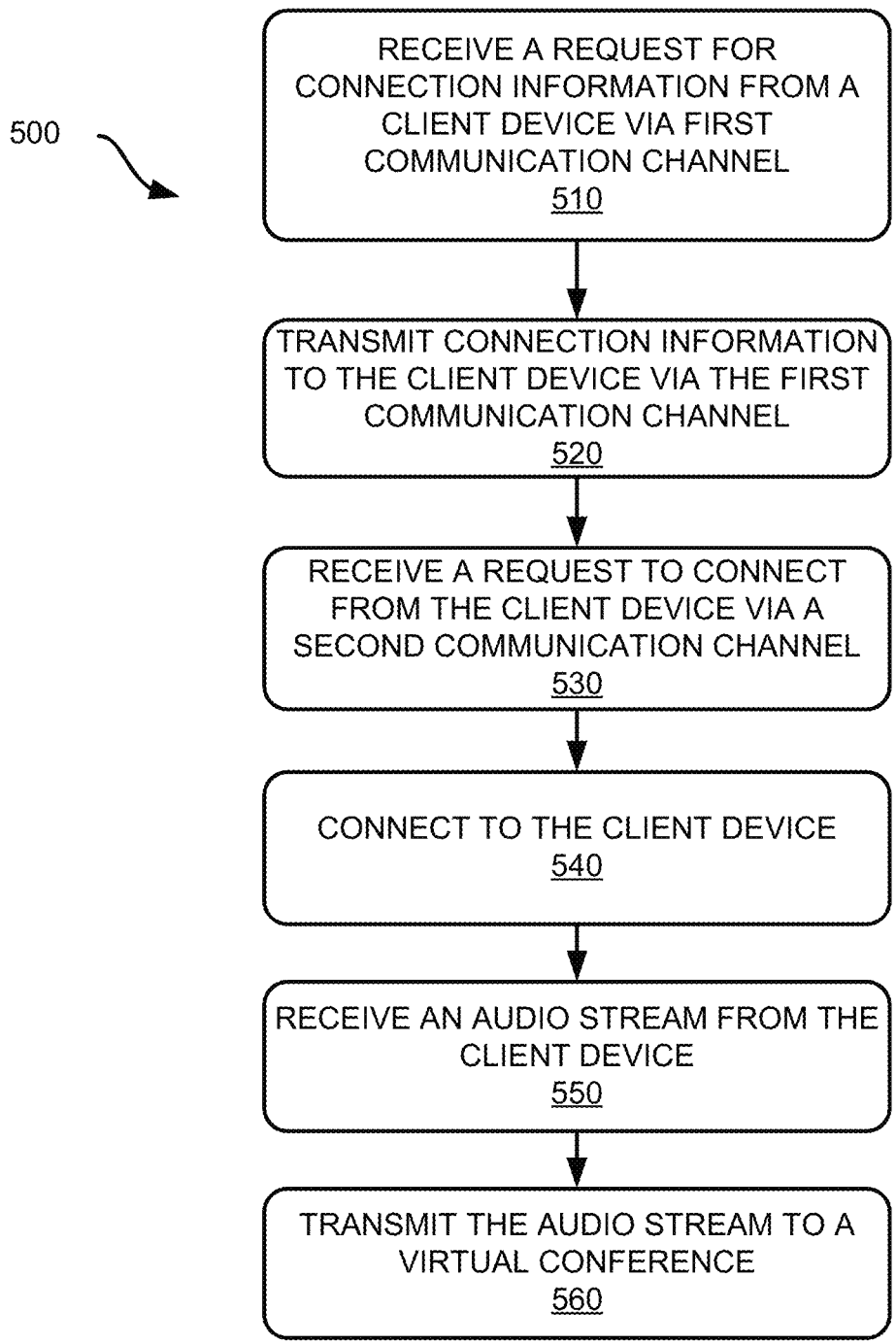
FIGS. 5-6 show example methods for ad hoc client audio device support for virtual conferences.

Referring now to FIG. 5, FIG. 5 shows an example method 500 for ad hoc client audio device support for virtual conferences. This example will be described with respect to the system 400 shown in FIGS. 4A-4D; however, any system for ad hoc client audio device support for virtual conferences according to this disclosure may be employed.

At block 510, the virtual conference device 330 receives a request for connection information from a remote client device 410a. In this example, the virtual conference device 330 is connected to a virtual conference hosted by a virtual conference provider 310. The virtual conference device 330 uses its microphone array 332 to receive an ultrasonic signal from a client device 410a; however, other examples may employ other types of peer-to-peer communication to request and obtain connection information, such as Bluetooth, NFC, etc. The virtual conference application 350 provides the request to its ad hoc audio interface 360, which decodes the request.

At block 520, the virtual conference device 330 transmits connection information to the client device 410a by outputting an ultrasonic signal using one or more of its speakers 336. In this example, the connection information is sent as a response to the request and includes connection information to enable a network connection between the client device 410a and the virtual conference device 330. In this example, the connection information includes an IP address of the virtual conference device 330. In some examples, the connection information may include a passcode, a URL, or other information to enable the participant's client device to connect to the virtual conference device 330. And while this example outputs ultrasound to transmit the connection information, in other examples, the virtual conference device 330 may transmit using another communication technique, such as Bluetooth.

It should be appreciated that in some examples, a client device 410a may not send a request for connection information. Instead, the virtual conference device 330 may repeatedly transmit connection information, such as embedded within an ultrasonic signal. To obtain the connection information, the client device 410a only needs to receive the ultrasonic signal and extract the connection information. Further, as discussed above, the client device 410a may obtain connection information from QR codes or bar codes affixed to the virtual conference device 330 rather than receiving a signal from the virtual conference device 330. Thus, a client device may obtain connection information from the virtual conference device 330 in other ways as well. Thus, in some examples, block 510 is an optional step.

At block 530, the virtual conference device 330 receives a request to connect from the client device 410a via a different communication channel than the request received at block 510. In this example, the virtual conference device 330 receives the request via the network interface 370 from a local area network ("LAN") connection provided by the wireless access point 420. The request may include any suitable information, such as an identity of the user or an identity of the device. Such information may be used to verify that the user or the device are authorized to connect to the virtual conference device 330. For example, the virtual conference device 330 may maintain or have access to a whitelist of authorized users or devices. If the user or device is present on the whitelist, the virtual conference device 330 may allow the device to connect at block 540 below. Otherwise, it may reject or deny the connection.

At block 540, the virtual conference device 330 connects to the client device 410a. In this example, the connection enables the client device 410a to transmit an audio stream to the virtual conference device 330.

At block 550, the virtual conference device 330 receives an audio stream from the client device 410a that was captured by a microphone of the remote client device 410a. The virtual conference device 330 receives the audio stream using its network interface via the connection established at 540.

At block 560, the virtual conference device 330 transmits the audio stream received from the client device 410a to the virtual conference provider 310 as though the audio stream had been captured by a dedicated microphone of the virtual conference device 330, e.g., by a microphone array 332. Thus, the audio feed presents to the virtual conference provider 310 as originating from the virtual conference device 330 rather than from the client device 410a. Though in some examples, the virtual conference device 330 may include identification information associated with the client device 410a, such as a username or a device identifier.

Figure 6:
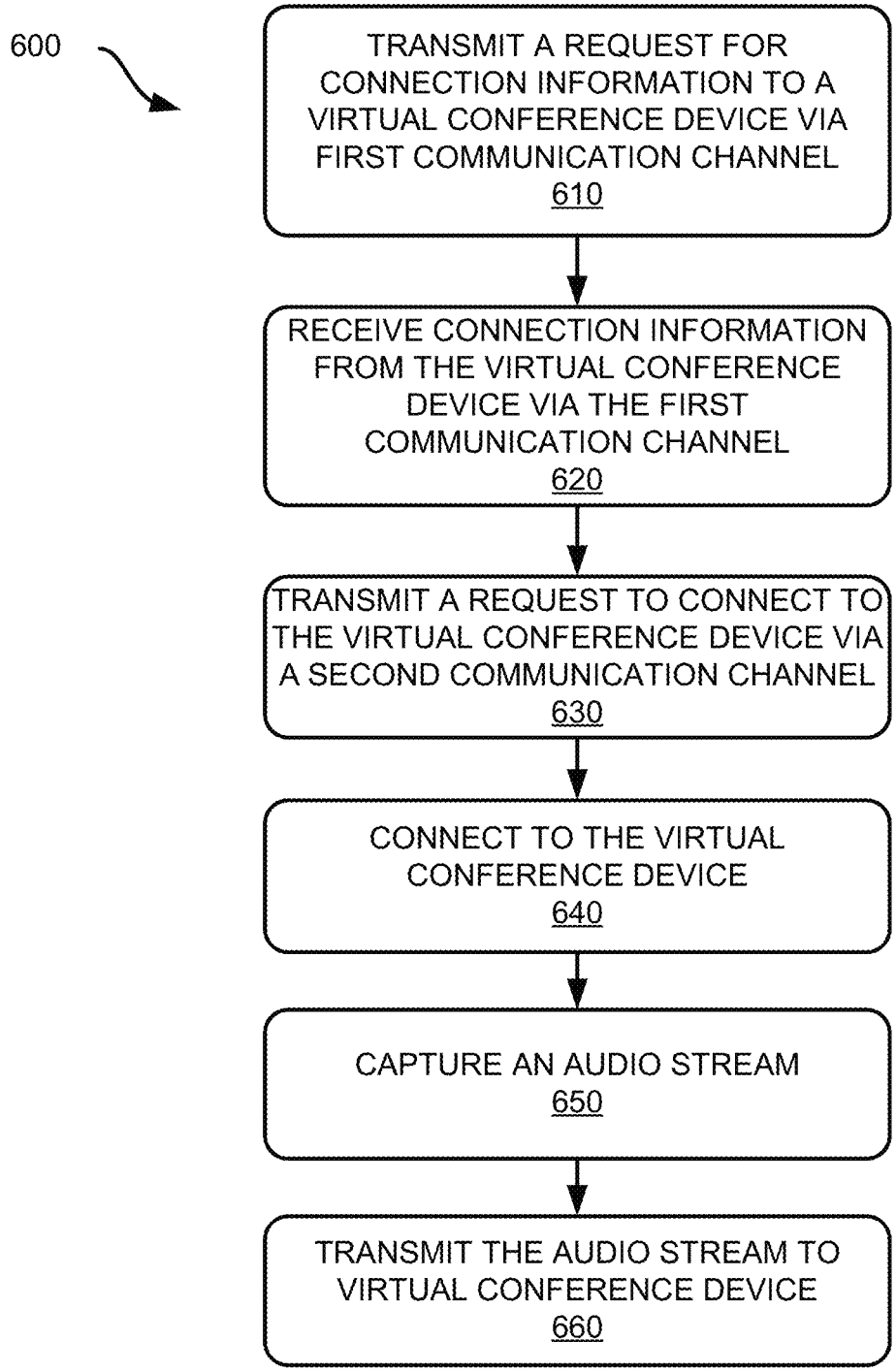

Referring now to FIG. 6, FIG. 6 shows an example method 600 for ad hoc client audio device support for virtual conferences. This example will be described with respect to the system 400 shown in FIGS. 4A-4D; however, any system for ad hoc client audio device support for virtual conferences according to this disclosure may be employed.

At block 610, a client device 410a transmits a request for connection information to a virtual conference device using a first communication channel. In this example, the client device 410a launches a virtual conference application 450 that includes an ad hoc audio interface 460. The user of the client device 410a may select an option 488 in a GUI 480 provided by the virtual conference application 450 to transmit the request. To transmit the request in this example, the ad hoc audio interface 460 causes the client device's speaker 436 to transmit an ultrasonic signal that can be received by the virtual conference device 330. However, in some examples, the network interface 370 may include a Bluetooth or NFC device that can transmit the request. Moreover, in some examples, the client device 410a may not need to transmit a request for connection information. As discussed above, the virtual conference device 330 may repeatedly transmit ultrasonic signals that include connection information. Alternatively, the client device 410a may obtain connection information by optically scanning a QR code or bar code.

At block 620, the client device 410a receives the connection information from the virtual conference device using the first communication channel. Thus, in this example, the client device 410a uses its microphone to receive an ultrasonic signal from the virtual conference device 330. In other examples, the client device 410a uses the same communication method to both send the request and receive the response, e.g., ultrasonic, Bluetooth, NFC, etc. However, in some examples, different communication methods can be used to send the request and receive the response.

At block 630, the client device 410a transmits a request to connect to the virtual conference device 330 using a second communication channel. In this example, the client device 410a transmits the request using its network interface and the available WiFi network. In other examples, the request may be sent via other communication channels such as a wired network connection (e.g., Ethernet), a universal serial bus ("USB") connection, a firewire connection, or Bluetooth.

As discussed above with respect to block 530, the request may include a request to connect as well as information about the user or the client device, such as a user profile, user name, or client device identifier.

At block 640, the client device 410a connects to the virtual conference device 330, generally as discussed above with respect to block 540. In some examples, the virtual conference device 330 will first verify the user is authorized to connect to the virtual conference device 330, such as discussed above with respect to block 530.

At block 650, the client device 410a uses its microphone 432 to capture an audio stream.

At block 660, the client device 410a transmits the captured audio stream to the virtual conference device 330 using the second communication channel and the connection established at block 640. As discussed above with respect to blocks 550-560, the virtual conference device 330 receives the audio stream and transmits it to the virtual conference provider 310.

Figure 7:
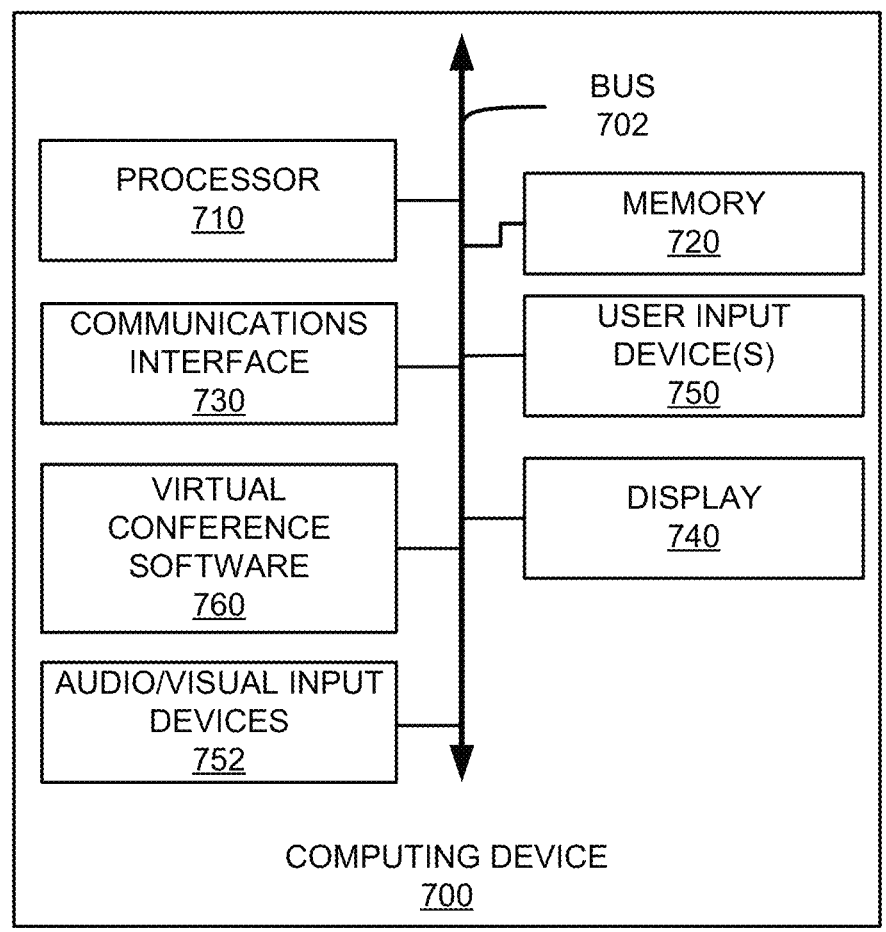
FIG. 7 shows an example computing device suitable for use with systems and methods for ad hoc client audio device support for virtual conferences.

Referring now to FIG. 7, FIG. 7 shows an example computing device 700 suitable for use in example systems or methods ad hoc client audio device support for virtual conferences according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for ad hoc client audio device support for virtual conferences according to different examples, such as part or all of the example methods 600-700 described above with respect to FIGS. 5-6. The computing device 700, in this example, also includes one or more user input devices 750, such as a keyboard, mouse, touchscreen, microphone, etc., to accept user input. The computing device 700 also includes a display 740 to provide visual output to a user.

In addition, the computing device 700 includes a virtual conferencing application 760 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 700 also includes a communications interface 740. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   transmitting, via a Bluetooth communication channel by a virtual conference device connected to a virtual conference hosted by a virtual conference provider, a first signal, the first signal including connection information to enable a network connection between a remote client device and the virtual conference device;
   receiving, via the Bluetooth communication channel by the virtual conference device connected to the virtual conference hosted by the virtual conference provider, a first request for the connection information from the remote client device;
   receiving, by the virtual conference device via a second communication channel, a request to connect from the remote client device;
   connecting to the remote client device using the second communication channel;
   receiving, via the connection to the remote client device, an audio stream from the remote client device, the audio stream captured by a microphone of the remote client device; and
   providing the audio stream to the virtual conference.

2. The method of claim 1, wherein the remote client device comprises one of a smartphone, a tablet computer, or a laptop computer.

3. The method of claim 1, wherein the connecting to the remote client device comprises connecting to the remote client device via a communications network using a network interface.

4. The method of claim 1, wherein the request comprises a user identity or a client device identity, and further comprising authenticating the user identity or the client device identity before connecting to the remote client device.

5. A system comprising:
   a communications interface;
   a non-transitory computer-readable medium; and
   one or more processors communicatively coupled to the communications interface and the non-transitory computer-readable medium, the one or more processors configured to execute processor-executable instructions stored in the non-transitory computer-readable medium to:
   transmit, via a Bluetooth communication channel while connected to a virtual conference hosted by a virtual conference provider, a first signal, the first signal including connection information to enable a network connection with a remote client device;
   receive, via the Bluetooth communication channel, a request for the connection information from the remote client device;
   receive, via a second communication channel, a request to connect from the remote client device;
   connect to the remote client device using the second communication channel;
   receive, via the connection to the remote client device, an audio stream from the remote client device, the audio stream captured by a microphone of the remote client device; and
   provide the audio stream to the virtual conference.

6. The system of claim 5, wherein the remote client device comprises one of a smartphone, a tablet computer, or a laptop computer.

7. The system of claim 5, wherein the one or more processors are configured to execute further processor-executable instructions stored in the non-transitory computer-readable medium to connect to the remote client device via a communications network using the communications interface.

8. The system of claim 5, wherein the request comprises a user identity or a client device identity, and wherein the one or more processors are configured to execute further processor-executable instructions stored in the non-transitory computer-readable medium to authenticate the user identity or the client device identity before connecting to the remote client device.

9. A non-transitory computer-readable medium comprising processor-executable instructions configured to cause one or more processors to:
   transmit, via a Bluetooth communication channel by a virtual conference device connected to a virtual conference hosted by a virtual conference provider, a first signal to a remote client device, the first signal including connection information to enable a network connection between the remote client device and the virtual conference device;
   receive, via the Bluetooth communication channel by the virtual conference device, a request for the connection information from the remote client device;
   receive, via a second communication channel, a request to connect from the remote client device;
   connect to the remote client device using the second communication channel;
   receive, via the connection to the remote client device, an audio stream from the remote client device, the audio stream captured by a microphone of the remote client device; and
   provide the audio stream to the virtual conference.

10. The non-transitory computer-readable medium of claim 9, further comprising processor-executable instructions configured to cause one or more processors to connect to the remote client device via a communications network using a network interface.

11. The non-transitory computer-readable medium of claim 9, wherein the request comprises a user identity or a client device identity, and further comprising processor-executable instructions configured to cause one or more processors to authenticate the user identity or the client device identity before connecting to the remote client device.

\* \* \* \* \*